(12) United States Patent
Sawyers (10) Patent No.: US 10,084,316 B2
(45) Date of Patent: Sep. 25, 2018

(54) DEVICE WITH BLOCKING RECTIFIER (71) Applicant: HEWLETT-PACKARD DEVELOPMENT COMPANY, L.P., Houston, TX (US)

(72) Inventor: Thomas P Sawyers, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 142 days.

(21) Appl. No.: 15/105,191

(22) PCT Filed: Jan. 31, 2014

(86) PCT No.: PCT/US2014/014331
§ 371 (c)(1),
(2) Date: Jun. 16, 2016

(87) PCT Pub. No.: WO2015/116222
PCT Pub. Date: Aug. 6, 2015

(65) Prior Publication Data
US 2016/0329718 A1    Nov. 10, 2016

(51) Int. Cl.
*B60L 11/18* (2006.01)
*B60L 3/00* (2006.01)
(Continued)

(52) U.S. Cl.
CPC .......... *H02J 3/385* (2013.01); *H02J 1/12* (2013.01); *H02J 3/387* (2013.01); *H02J 3/48* (2013.01);
(Continued)

(58) Field of Classification Search
None
See application file for complete search history.

(56) References Cited

U.S. PATENT DOCUMENTS 7,688,021 B2    3/2010    Freiman et al.
7,888,907 B2    2/2011    Litovsky et al.
(Continued)

FOREIGN PATENT DOCUMENTS

JP    06-307733    11/1994
JP    09-046924    2/1997

OTHER PUBLICATIONS

Lee, et al.; "Single Switching Double Powering Converter for Reducing Power Consumption of AC/DC Adapter in Standby Mode".
(Continued)

*Primary Examiner* — Jared Fureman
*Assistant Examiner* — Aqeel Bukhari
(74) *Attorney, Agent, or Firm* — Dicke, Billig & Czaja, PLLC (57) ABSTRACT

One example of a device includes an output terminal to electrically couple to a load, a first input terminal to electrically couple to a first voltage source, and a blocking rectifier electrically coupled between the first input terminal and the output terminal. The device includes a second input terminal to electrically couple to a second voltage source. The second input terminal is electrically coupled to the output terminal. The device includes a control circuit to control the second voltage source to prevent a voltage at the output terminal from exceeding a voltage at the first input terminal and to deliver power to the load in place of power delivered by the first voltage source.

13 Claims, 5 Drawing Sheets

(51) Int. Cl.
H01M 10/42 (2006.01)
H01M 10/48 (2006.01)
H02J 3/38 (2006.01)
H02M 3/00 (2006.01)
H02M 7/04 (2006.01)
H02J 1/12 (2006.01)
H02J 3/48 (2006.01)
H02M 1/00 (2006.01)

(52) U.S. Cl.
CPC ............... H02M 3/00 (2013.01); H02M 7/04 (2013.01); *H02M 2001/007* (2013.01); *H02M 2001/0025* (2013.01)

(56) References Cited

U.S. PATENT DOCUMENTS

| | | | |
|---|---|---|---|
| 7,969,043 B2 | 6/2011 | Caraghiorghiopol et al. | |
| 8,034,494 B2 | 10/2011 | Kelley et al. | |
| 8,129,937 B2 | 3/2012 | Ko et al. | |
| 8,378,521 B2 | 2/2013 | Rufer et al. | |
| 2009/0315401 A1* | 12/2009 | Yoshida | H02J 9/061 307/44 |
| 2011/0148194 A1* | 6/2011 | Lai | H02J 7/0055 307/23 |
| 2012/0019071 A1 | 1/2012 | Lin et al. | |
| 2015/0016159 A1* | 1/2015 | Deboy | H02J 3/383 363/71 |
| 2015/0214787 A1* | 7/2015 | Gerhardinger | H02J 1/12 307/26 |

OTHER PUBLICATIONS

Byoung-Hee Lee, Young-Do Kim, Gun-Woo Moon Daehak-ro, Ynseong-gu, Daejeon, Korea https://ieeexplore.ieee.org/document/5944580/.

* cited by examiner

DEVICE WITH BLOCKING RECTIFIER

BACKGROUND

Many consumers are seeking to reduce their dependence on power generated by power plants. Alternative power sources have been proliferating in the last several years and consumers seek to become more "green" by utilizing these alternative power sources. Many electronic devices are powered by batteries or by Alternating Current (AC) power. Some electronic devices use an AC adapter to power the device or to charge batteries that power the device.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Alternative power sources, such as Photo-Voltaic (PV) panels (e.g., solar panels), fuel cells, and wind turbines, are not easily integrated with AC and/or battery powered electronic devices. Accordingly, examples of the disclosure include a device (e.g., an adapter) that may be connected between a typical power source (e.g., an AC power source), an alternative power source, and an electronic device to be powered by the typical power source and the alternative power source. The electronic device draws power from the alternative power source to substitute for power that would have been drawn from the typical power source absent the alternative power source. In this way, the alternative power source may reduce or supplant the power drawn from the typical power source.

Figure 1:
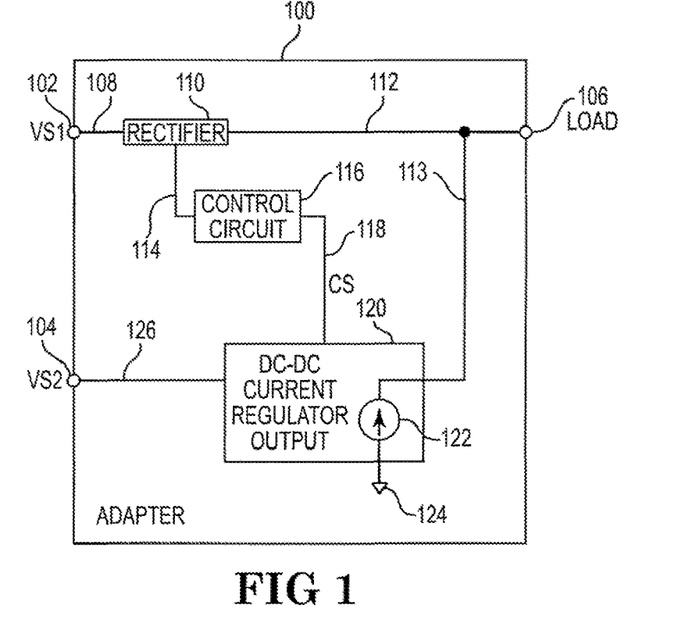
FIG. 1 is block diagram illustrating one example of an adapter for the controlled summation of Direct Current (DC) power sources.

FIG. 1 is block diagram illustrating one example of an adapter 100 for the controlled summation of Direct Current (DC) power sources. Adapter 100 includes a first input terminal 102, a second input terminal 104, and an output terminal 106. In one example, each of the terminals includes a male or female connector or other suitable connector for electrically coupling the terminal to other devices. Adapter 100 includes a blocking rectifier 110, a control circuit 116, and a DC to DC converter 120. First input terminal 102 is electrically coupled to an input of blocking rectifier 110 through signal path 108. An output of blocking rectifier 110 is electrically coupled to output terminal 106 through signal path 112. Blocking rectifier 110 is electrically coupled to an input of control circuit 116 through signal path 114. An output of control circuit 116 is electrically coupled to an input of DC to DC converter 120 through Control Signal (CS) path 118. Second input terminal 104 is electrically coupled to an input of DC to DC converter 120 through signal path 126. DC to DC converter 120 is electrically coupled to ground 124 and provides a regulated output current as indicated at 122. An output of DC to DC converter 120 is electrically coupled to output terminal 106 through signal path 113.

Adapter 100 is an electronic device to receive a first DC voltage from a first voltage source (VS1) electrically coupled to first input terminal 102 and a second DC voltage from a second voltage source (VS2) electrically coupled to second input terminal 104 to power a load electrically coupled to output terminal 106. The first DC voltage and the second DC voltage may be the same voltage level or different voltage levels. Each of the first voltage source and the second voltage source may be provided by any suitable power source, such as an Alternating Current (AC) to DC adapter, a Photo-Voltaic (PV) panel (e.g., a solar panel), a battery, a fuel cell, or other suitable device.

In one example, adapter 100 may be a separate device that may be electrically coupled to the first voltage source, the second voltage source, and the load via electrical connectors that may be connected and disconnected such that adapter 100 may be used with different voltage sources and loads. In other examples, adapter 100 may be integrated into the first voltage source, the second voltage source, or the load.

Adapter 100 prevents the voltage at output terminal 106 from exceeding the voltage at first input terminal 102. The current drawn by the load is provided by the second voltage source electrically coupled to second input terminal 104 up to the maximum current that can be provided by the second voltage source, and the remaining current drawn by the load, if any, is provided by the first voltage source electrically coupled to first input terminal 102. Therefore, in one example, while the first voltage source is capable of providing all the power used by the load, the second voltage source is used to replace the power provided by the first voltage source. The power provided to the load by the second voltage source may vary during operation, but from the perspective of the load, the function of adapter 100 is transparent as though the load were directly connected to only the first voltage source. Accordingly, a supplemental voltage source that may not be capable of fully powering the load or that may have a varying power output may be used in combination with another voltage source without detrimentally effecting the operation of the load.

Blocking rectifier 110 allows current to pass from signal path 108 to signal path 112 while blocking current from passing from signal path 112 to signal path 108. Blocking rectifier 110 prevents a current provided by DC to DC converter 120 from back feeding to the first voltage source electrically coupled to first input terminal 102. Blocking rectifier 110 may be a diode, a Metal-Oxide-Semiconductor Field-Effect Transistor (MOSFET) with a control circuit, or another suitable circuit for preventing a current provided by DC to DC converter 120 from back feeding to first input terminal 102 while allowing a current at first input terminal 102 to pass to output terminal 106.

DC to DC converter 120 receives a DC voltage on signal path 126 to provide a regulated output current on signal path 113. Control circuit 116 monitors the voltage drop across blocking rectifier 110 and controls DC to DC converter 120 by providing a control signal through signal path 118. Control circuit 116 controls the regulated output current provided by DC to DC converter 120 so that the voltage at the output of blocking rectifier 110 on signal path 112 does not exceed the voltage at the input of blocking rectifier 110 on signal path 108. Accordingly, in one example, the voltage provided to the load at output terminal 106 is substantially equal to the first DC voltage provided at first input terminal 102.

In operation, the current on signal path 112 is summed with the current on signal path 113 to supply a load electrically coupled to output terminal 106. The load draws power from the second voltage source electrically coupled to second input terminal 104 up to either the maximum power capable of being provided by the second voltage source or up to the maximum power used by the load. If the second voltage source can supply all the power to the load, the first voltage source coupled to first input terminal 102 is unloaded. Control circuit 116 limits the output of DC to DC converter 120 to prevent the DC to DC converter 120 from providing too much power to the load. Control circuit 116 controls the voltage at the output of blocking rectifier 110 on signal path 112 so that the voltage does not exceed the voltage at the input of blocking rectifier 110 on signal path 108. If the second voltage source and the DC to DC converter 120 cannot provide all the power to the load, the remaining power is drawn from the first voltage source electrically coupled to first input terminal 102.

Figure 2:
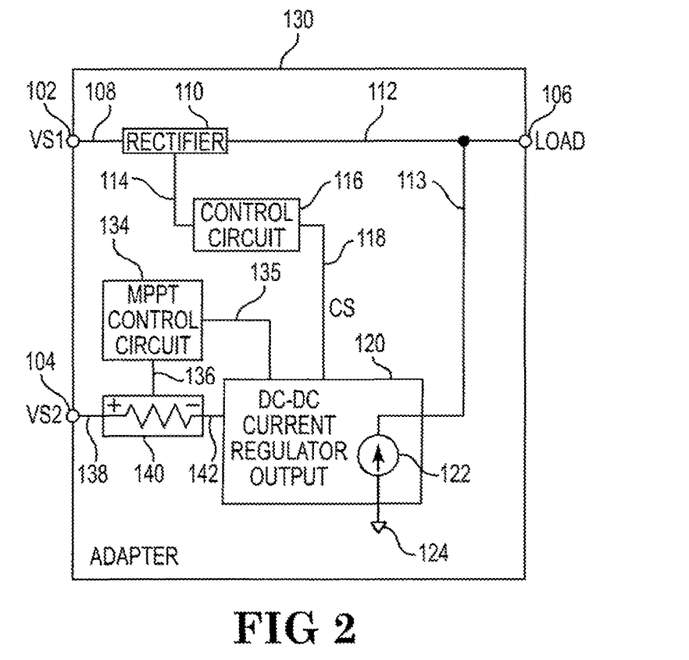
FIG. 2 is a block diagram illustrating another example of an adapter or the controlled summation of DC power sources.

FIG. 2 is a block diagram illustrating another example of an adapter 130 for the controlled summation of DC power sources. Adapter 130 is similar to adapter 100 previously described and illustrated with reference to FIG. 1, except that adapter 130 includes a Maximum Power Point Tracker (MPPT). The MPPT tracker includes a MPPT tracker control circuit 134 and a resistor 140. Second input terminal 104 is electrically coupled to one side of resistor 140 through signal path 138. The other side of resistor 140 is electrically coupled to an input of DC to DC converter 120 through signal path 142. Resistor 140 is electrically coupled to an input of MPPT control circuit 134 through signal path 136. An output of MPPT control circuit 134 is electrically coupled to an input of DC to DC converter 120 through signal path 135.

MPPT control circuit 134 senses the current through resistor 140 and the voltage on signal path 138 to provide a control signal to DC to DC converter 120 through signal path 135. MPPT control circuit 134 controls DC to DC converter 120 to control the current drawn from the second voltage source electrically coupled to second input terminal 104 to maximize the power provided by the second voltage source. In one example, the MPPT is used when the second voltage source is a PV panel.

Figure 3:
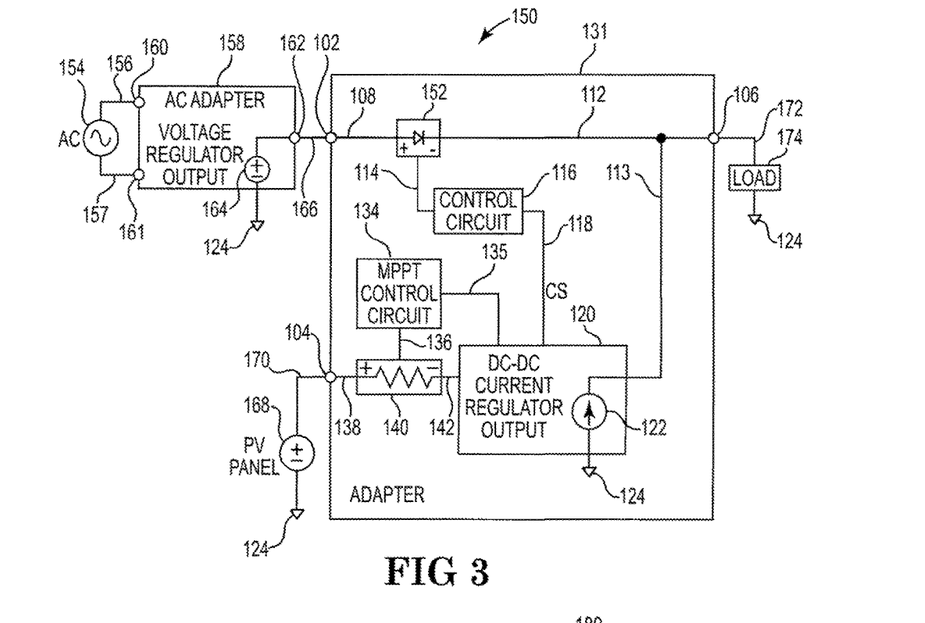
FIG. 3 is a block diagram illustrating one example of a system including one example of the adapter illustrated in FIG. 2.

FIG. 3 is a block diagram illustrating one example of a system 150 including one example of adapter 130 illustrated in FIG. 2. System 150 includes an adapter 131, an AC power source 154, an AC adapter 158, a PV panel 168, and a load 174. Adapter 131 delivers power to load 174 from AC adapter 158 and from PV panel 168. Load 174 may be any suitable load, such as a laptop computer, portable electronic device, or other suitable device.

Adapter 131 is similar to adapter 130 previously described and illustrated with reference to FIG. 2, except that in adapter 131 blocking rectifier 110 is a diode 152. The anode of diode 152 is electrically coupled to first input terminal 102 through signal path 108. The cathode of diode 152 is electrically coupled to output terminal 106 through signal path 112.

AC adaptor 158 is an AC to DC converter and includes input terminals 160 and 161 and an output terminal 162. One side of an AC power source 154 is electrically coupled to input terminal 161 of AC adapter 158 through signal path 157, and the other side of AC power source 154 is electrically coupled to input terminal 160 of AC adapter 158 through signal path 156. AC adapter 158 converts the AC voltage received from AC power source 154 to provide a regulated DC output voltage. The regulated DC output voltage is indicated by voltage regulator output source 164, which has one side electrically coupled to common or ground 124 and the other side electrically coupled to output terminal 162. Output terminal 162 of AC adapter 158 is electrically coupled to first input terminal 102 of adapter 131 through signal path 166.

One side of PV panel 168 is electrically coupled to common or ground 124, and the other side of PV panel 168 is electrically coupled to second input terminal 104 of adapter 131 through signal path 170. Output terminal 106 of adapter 131 is electrically coupled to one side of load 174 through signal path 172, and the other side of load 174 is electrically coupled to common or ground 124. MPPT control circuit 134 controls DC to DC converter 120 to control the current drawn from PV panel 168 to maximize the power provided by PV panel 168.

In operation of system 150, if PV panel 168 delivers all the current load 174 uses, AC adapter 158 is unloaded. If PV panel 168 delivers too much current to load 174, the voltage at load 174 (i.e., at the cathode of diode 152) will increase. To prevent the increase in voltage at load 174, control circuit 116 monitors the voltage across diode 152. If the voltage at load 174 exceeds the voltage at the output of AC adapter 158 (i.e., at the anode of diode 152), the regulated output current of DC to DC converter 120 is reduced such that the DC to DC converter provides only the current used by the load and the voltage at load 174 is regulated to substantially equal the output voltage of AC adapter 158. In this way, the voltage at load 174 is substantially similar to the output voltage of AC adapter 158.

The voltage of AC adapter 158 may be fixed, such as +19.5 VDC, +15 VDC, +12 VDC, +6.5 VDC, or adjustable, such as adjustable from +6.5 VDC up to +9 VDC. In one example, AC adapter 158 may have a constant power limit. DC to DC converter 120 is designed to adapt to any suitable output voltage provided by AC adapter 158, provided that AC adapter 158 is useable to power load 174. DC to DC converter 120 may include protection features. In one example, DC to DC converter 120 includes an output voltage control loop to clamp the output voltage to a safe level if AC adapter 158 is disconnected from adapter 131 while providing current.

Adapter 131 in system 150 enables load 174 to be consistently powered while being supplemented with power from alternative power source PV panel 168. Therefore, despite varying weather conditions, the size of PV panel 168, the size of load 174, or other factors, load 174 continues to operate. If PV panel 168 alone does not provide sufficient power to meet the power draw of load 174, load 174 draws additional power from AC adapter 158 to meet the power draw of load 174.

In other examples, two or more PV panels may be used together in system 150 with each PV panel having its own DC to DC converter, MPPT, and control feedback. AC adapter 158 may be replaced by a battery such that the battery load is reduced whenever PV panel 168 provides power. A large, high power PV panel may also be tapped into to provide power. In other examples, PV panel 168 may be substituted by a fuel cell.

Figure 4:
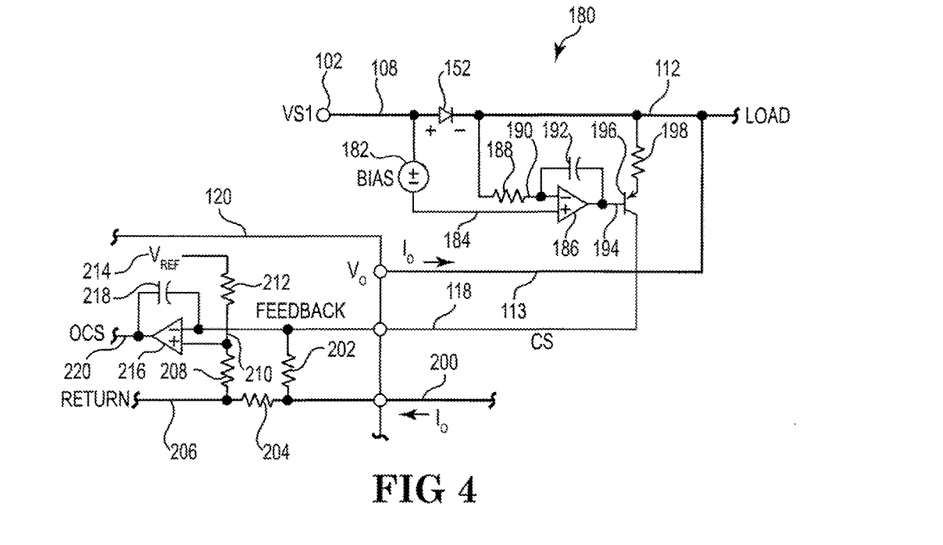
FIG. 4 is a schematic diagram illustrating one example of a portion of the system illustrated in FIG. 3.

FIG. 4 is a schematic diagram illustrating one example of a portion 180 of system 150 illustrated in FIG. 3. Portion 180 of system 150 includes blocking rectifier 152; a control circuit including a bias voltage source 182, an Operational Amplifier (op-amp) 186, resistors 188 and 198, a capacitor 192, and a bipolar transistor 196; and a portion of DC to DC converter 120. The portion of DC to DC converter 120 includes a reference voltage ($V_{REF}$) 214, an op-amp 216, a capacitor 218, and resistors 202, 204, 208, and 212.

First input terminal 102 is electrically coupled to the anode of diode 152 and the positive terminal of bias voltage source 182 through signal path 108. The negative terminal of bias voltage source 182 is electrically coupled to the non-inverting input of op-amp 186 through signal path 184. The cathode of diode 152 is electrically coupled to one side of resistor 188 and one side of resistor 198 through signal path 112. The other side of resistor 188 is electrically coupled to the inverting input of op-amp 186 and one side of capacitor 192 through signal path 190. The other side of capacitor 192 is electrically coupled to the output of op-amp 186 and to the base of PNP transistor 196 through signal path 194. The emitter of transistor 196 is electrically coupled to the other side of resistor 198. The collector of transistor 196 is electrically coupled to one side of resistor 202, one side of capacitor 218, and the inverting input of op-amp 216 through control signal path 118.

The output voltage ($V_O$) and output current ($I_O$) of DC to DC converter 120 is provided on signal path 113. The return current ($I_O$) to DC to DC converter 120 is provided on signal path 200, which is electrically coupled to the other side of resistor 202 and one side of resistor 204. The other side of resistor 204 is electrically coupled to one side of resistor 208 through return signal path 206. The other side of resistor 208 is electrically coupled to the non-inverting input of op-amp 216 and one side resistor 212 through signal path 210. The other side of resistor 212 is electrically coupled to reference voltage ($V_{REF}$) 214. The other side of capacitor 218 is electrically coupled to the output of op-amp 216 through Output Control Signal (OCS) signal path 220.

Op-amp 186, resistor 188, and capacitor 192 are configured as an error amplifier to control the voltage across diode 152 such that the voltage across diode 152 is substantially equal to the bias voltage provided by bias voltage source 182. In one example, the bias voltage is greater than the maximum offset voltage of op-amp 186. The output of op-amp 186 drives transistor 196, which is configured as an adjustable current source. Transistor 196 provides a control signal on signal path 118 to control the regulated current ($I_O$) output by DC to DC converter 120 to maintain the voltage drop across diode 152 as set by the bias voltage.

Op-amp 216, capacitor 218, and resistors 202 and 204 are configured as an error amplifier to control the current output ($I_O$) by DC to DC converter 120 on signal path 113. The return current on signal path 200, which substantially equals the current ($I_O$) on signal path 113, and the control signal on signal path 118 generate a voltage via resistors 204 and 202 to provide a feedback voltage at the inverting input of op-amp 216. Reference voltage 214 and a voltage divider provided by resistors 212 and 208 provide a fixed voltage at the non-inverting input of op-amp 216. Reference voltage 214 and resistors 212 and 208 are selected to provide a fixed voltage that is proportional to output current ($I_O$). Op-amp 216 compares the fixed voltage on signal path 210 to the feedback voltage on signal path 118, as modified by transistor 196, to provide an output control signal on signal path 220. The output control signal controls the regulated output current ($I_O$) provided by DC to DC converter 120.

In response to the feedback voltage being less than the fixed voltage, the output of op-amp 216 increases. In response to the output of op-amp 216 increasing, DC to DC converter 120 increases the output current ($I_O$) until the feedback voltage equals the fixed voltage. In response to the feedback voltage being greater than the fixed voltage, the output of op-amp 216 decreases. In response to the output of op-amp 216 decreasing, DC to DC converter 120 decreases the output current ($I_O$) until the feedback voltage equals the fixed voltage, in response to the voltage across diode 152 exceeding the bias voltage 182, op-amp 186 drives the adjustable current source of transistor 196 to increase the feedback voltage, resulting in the output of op-amp 216 decreasing, thus regulating the voltage across diode 152.

Figure 5:
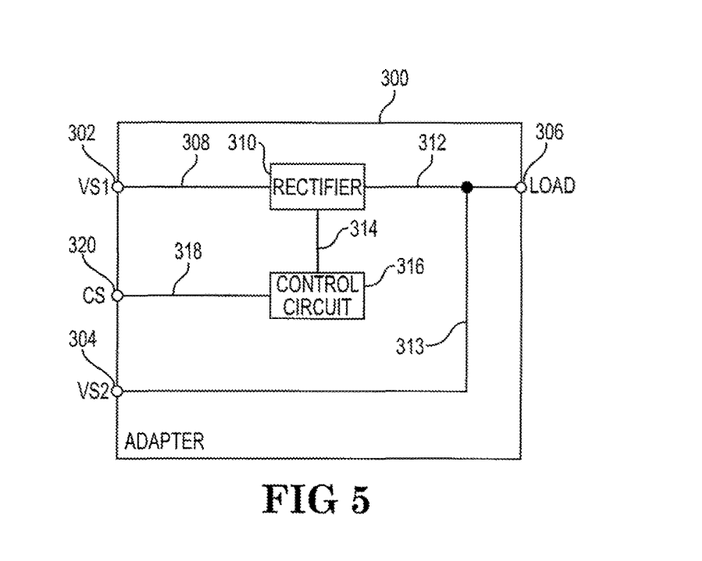
FIG. 5 is a block diagram illustrating another example of an adapter for the controlled summation of DC power sources.

FIG. 5 is a block diagram illustrating another example of an adapter 300 for the controlled summation of DC power sources. Adapter 300 includes a first input terminal 302, a second input terminal 304, an output terminal 306, and a control signal terminal 320. Adapter 300 includes a blocking rectifier 310 and a control circuit 316. First input terminal 302 is electrically coupled to an input of blocking rectifier 310 through signal path 308. An output of blocking rectifier 310 is electrically coupled to output terminal 306 through signal path 312. Blocking rectifier 310 is electrically coupled to an input of control circuit 316 through signal path 314. An output of control circuit 316 is electrically coupled to control signal terminal 320 through signal path 318. Second input terminal 304 is electrically coupled output terminal 306 through signal path 313.

Adapter 300 is an electronic device to receive a first DC voltage from a first voltage source (VS1) electrically coupled to first input terminal 302 and a second DC voltage from a second voltage source (VS2) electrically coupled to second input terminal 304 to power a load electrically coupled to output terminal 306. Adapter 300 prevents the voltage at output terminal 306 from exceeding the voltage at first input terminal 302. The current drawn by the load is provided by the second voltage source electrically coupled to second input terminal 304 up to the maximum current that can be provided by the second voltage source, and the remaining current drawn by the load, if any, is provided by the first voltage source electrically coupled to first input terminal 302.

Blocking rectifier 310 allows current to pass from signal path 308 to signal path 312 while blocking current from passing from signal path 312 to signal path 308. Blocking rectifier 310 prevents a current provided by the second voltage source electrically coupled to second input terminal 304 from back feeding to the first voltage source electrically coupled to first input terminal 302. Blocking rectifier 310 may be a diode, a MOSFET with a control circuit, or another suitable circuit for preventing a current from second input terminal 304 from back feeding to first input terminal 302 while allowing a current at first input terminal 302 to pass to output terminal 306.

Control circuit 316 monitors the voltage drop across blocking rectifier 310 and controls the second voltage source electrically coupled to second input terminal 304 by providing a control signal through signal path 318 to control signal terminal 320. Control circuit 316 controls the second voltage source so that the voltage at the output of blocking rectifier 310 on signal path 312 does not exceed the voltage at the input of blocking rectifier 310 on signal path 308. Accordingly, in one example, the voltage provided to the load at output terminal 306 is substantially equal to the first DC voltage provided at first input terminal 302.

In operation, the current on signal path 312 is summed with the current on signal path 313 to supply a load electrically coupled to output terminal 306. The load draws power from the second voltage source electrically coupled to second input terminal 304 up to either the maximum power capable of being provided by the second voltage source or up to the maximum power used by the load. If the second voltage source can supply all the power to the load, the first voltage source coupled to first input terminal 302 is unloaded. Control circuit 316 limits the output of the second voltage source to prevent too much power from being provided to the load. If the second voltage source cannot provide all the power to the load, the remaining power is drawn from the first voltage source electrically coupled to first input terminal 302.

Figure 6:
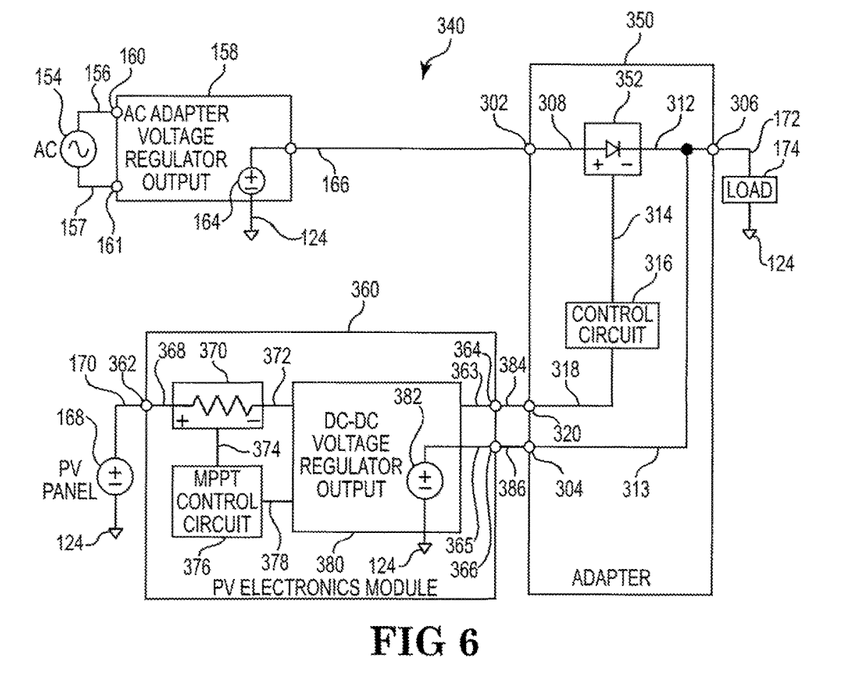
FIG. 6 is a block diagram illustrating one example of a system including one example of the adapter illustrated in FIG. 5.

FIG. 6 is a block diagram illustrating one example of a system 340 including one example of adapter 300 illustrated in FIG. 5. System 340 includes an adapter 350, an AC power source 154, an AC adapter 158, a PV panel 168, a PV electronics module 360, and a load 174. Adapter 350 delivers power to load 174 from AC adapter 158 and from PV panel 168 and PV electronics module 360. Load 174 may be any suitable load, such as a laptop computer, portable electronic device, or other suitable device.

Adapter 350 is similar to adapter 300 previously described and illustrated with reference to FIG. 5, except that in adapter 350 blocking rectifier 310 is a diode 352. The anode of diode 352 is electrically coupled to first input terminal 302 through signal path 308. The cathode of diode 352 is electrically coupled to output terminal 306 through signal path 312.

AC adaptor 158 is similar to AC adaptor 158 previously described and illustrated with reference to FIG. 3. PV panel 168 is similar to PV panel 168 previously described and illustrated with reference to FIG. 3. PV electronics module 360 includes an input terminal 362, an output terminal 366, and a control signal terminal 364. PV electronics module 360 includes a DC to DC converter 380 and a MPPT. The MPPT includes a MPPT control circuit 376 and a resistor 370.

One side of PV panel 168 is electrically coupled to common or ground 124, and the other side of PV panel 168 is electrically coupled to input terminal 362 of PV electronics module 360 through signal path 170. Input terminal 362 is electrically coupled to one side of resistor 370 through signal path 368. The other side of resistor 370 is electrically coupled to an input of DC to DC converter 380 through signal path 372. Resistor 370 is electrically coupled to an input of MPPT control circuit 376 through signal path 374. An output of MPPT control circuit 376 is electrically coupled to an input of DC to DC converter 380 through signal path 378.

DC to DC converter 380 is electrically coupled to ground 124 and provides a regulated output voltage as indicated at 382. An input of DC to DC converter 380 is electrically coupled to control signal terminal 364 through signal path 363. An output of DC to DC converter 380 is electrically coupled to output terminal 366 through signal path 365. Control signal terminal 364 of PV electronics module 360 is electrically coupled to control signal terminal 320 of adapter 350 through signal path 384. Output terminal 366 of PV electronics module 360 is electrically coupled to second input terminal 304 of adapter 350 through signal path 386.

DC to DC converter 380 receives a DC voltage on signal path 372 to provide a regulated output voltage on signal path 365. Control circuit 316 monitors the voltage drop across diode 352 and controls DC to DC converter 380 by providing a control signal through signal path 363. Control circuit 316 controls the regulated output voltage provided by DC to DC converter 380 so that the load voltage on signal path 172 does not exceed the first DC voltage on signal path 308. Accordingly, in one example, the voltage provided to the load at output terminal 306 is substantially equal to the first DC voltage provided at first input terminal 302.

MPPT control circuit 376 senses the current through resistor 370 and the voltage on signal path 368 to provide a control signal to DC to DC converter 380 through signal path 378. MPPT control circuit 376 controls DC to DC converter 380 to control the current drawn from PV panel 168 to maximize the power provided by PV panel 168.

In operation of system 340, if PV panel 168 delivers all the current load 174 uses, AC adapter 158 is unloaded. If PV panel 168 delivers too much current to load 174, the voltage at load 174 (i.e., at the cathode of diode 352) will increase. To prevent the increase in voltage at load 174, control circuit 316 monitors the voltage across diode 352. If the voltage at load 174 exceeds the voltage at the output of AC adapter 158 (i.e., at the anode of diode 352), the regulated output voltage of DC to DC converter 380 is reduced such that the DC to DC converter provides only the current used by the load and the voltage at load 174 is regulated to substantially equal the output voltage of AC adapter 158. In this way, the voltage at load 174 is substantially similar to the output voltage of AC adapter 158. DC to DC converter 380 adapts to any suitable output voltage provided by AC adapter 158, provided that AC adapter 158 is useable to power load 174. In one example, DC to DC converter 380 includes an output voltage control loop to clamp the output voltage to a safe level if AC adapter 158 is disconnected from adapter 350 while providing current.

Adapter 350 in system 340 enables load 174 to be consistently powered while being supplemented with power from alternative power source PV panel 168 and PV electronics module 360. Therefore, despite varying weather conditions, the size of PV panel 168, the size of load 174, or other factors, load 174 continues to operate. If PV panel 168 does not provide sufficient power to meet the power draw of load 174, load 174 draws additional power from AC adapter 158 to meet the power draw of load 174.

Figure 7:
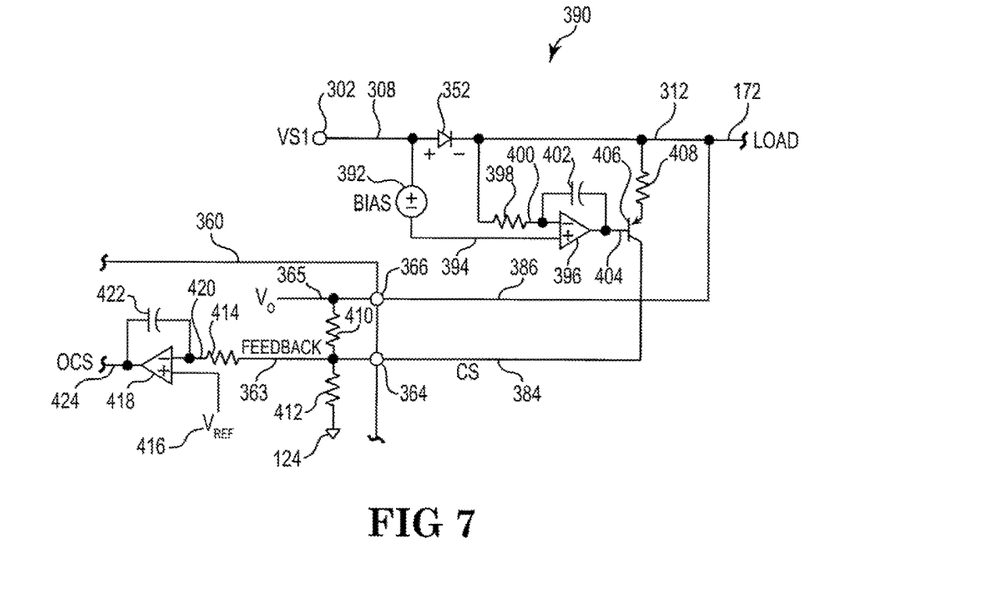
FIG. 7 is a schematic diagram illustrating one example of a portion of the system illustrated in FIG. 6.

FIG. 7 is a schematic diagram illustrating one example of a portion 390 of system 340 illustrated in FIG. 6. Portion 390 of system 340 includes blocking rectifier 352; a control circuit including a bias voltage source 392, an op-amp 396, resistors 398 and 408, a capacitor 402, and a bipolar transistor 406; and a portion of DC to DC converter 380. The portion of DC to DC converter 380 includes a reference voltage ($V_{REF}$) 416, an op-amp 418, a capacitor 422, and resistors 410, 412, and 414.

First input terminal 302 is electrically coupled to the anode of diode 352 and the positive terminal of bias voltage source 392 through signal path 308. The negative terminal of bias voltage source 392 is electrically coupled to the non-inverting input of op-amp 396 through signal path 394. The cathode of diode 352 is electrically coupled to one side of resistor 398 and one side of resistor 408 through signal path 312. The other side of resistor 398 is electrically coupled to the inverting input of op-amp 396 and one side of capacitor 402 through signal path 400. The other side of capacitor 402 is electrically coupled to the output of op-amp 396 and to the base of PNP transistor 406 through signal path 404. The emitter of transistor 406 is electrically coupled to the other side of resistor 408. The collector of transistor 406 is electrically coupled to one side of resistor 410, one side of resistor 412, and one side of resistor 414 through control signal path 384, control signal terminal 364, and signal path 363.

The output voltage (Vo) of DC to DC converter 380 is provided on signal path 365, which is electrically coupled to the other side of resistor 410. The other side of resistor 412 is electrically coupled to common or ground 124. The other side of resistor 414 is electrically coupled to the inverting input of op-amp 418 and one side of capacitor 422 through signal path 420. The other side of capacitor 422 is electrically coupled to the output of op-amp 418 through output control signal path 424. The non-inverting input of op-amp 418 is electrically coupled to reference voltage 416.

Op-amp 396, resistor 398, and capacitor 402 are configured as an error amplifier to control the voltage across diode 352 such that the voltage across diode 352 is substantially equal to the bias voltage provided by bias voltage source 392. In one example, the bias voltage is greater than the maximum offset voltage of op-amp 396. The output of op-amp 396 drives transistor 406, which is configured as an adjustable current source. Transistor 406 provides a control signal on signal path 384 to control the regulated voltage output by DC to DC converter 380 to maintain the voltage drop across diode 352 as set by the bias voltage.

Op-amp 418, capacitor 422, and resistor 414 are configured as an error amplifier. Resistors 410 and 412 provide a voltage divider that samples the regulated output voltage on signal path 365. The current generated by resistor 410 and the current on control signal path 384 are summed to provide a feedback signal on signal path 363. The feedback signal on signal path 363 generates a voltage across resistor 414 to provide a voltage signal to the inverting input of op-amp 418. The voltage on signal path 420 is compared to the reference voltage 416 by op-amp 418 to provide an output control signal on signal path 424 that controls the regulated output voltage of DC to DC converter 380. Reference voltage 416 and resistors 410 and 412 are selected to provide a fixed voltage that is proportional to the regulated output voltage.

In response to the voltage on signal path 420 being less than the reference voltage, the output of op-amp 418 increases. In response to the output of op-amp 418 increasing, DC to DC converter 380 increases the output voltage until the voltage on signal path 420 equals the reference voltage. In response to the voltage on signal path 420 being greater than the reference voltage, the output of op-amp 418 decreases. In response to the output of op-amp 418 decreasing, DC to DC converter 380 decreases the output voltage until the voltage on signal path 420 equals the reference voltage. By decreasing the output voltage, the current provided by DC to DC converter 380 is also reduced. By decreasing the current, the voltage at load 174 is reduced to regulate the voltage at load 174 substantially equal to the voltage VS1 at input terminal 302.

Figure 8:
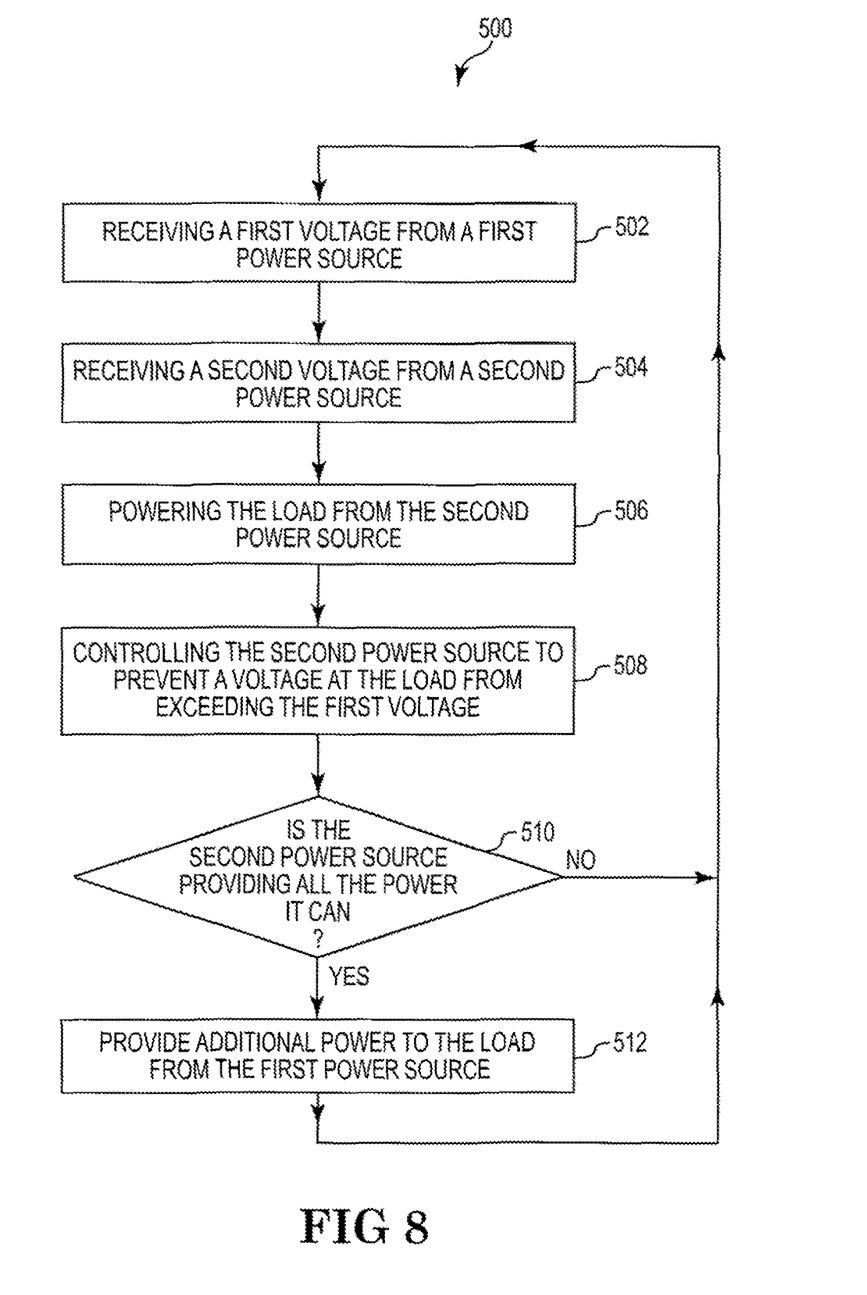
FIG. 8 is a flow chart illustrating one example of a method for powering a load.

FIG. 8 is a flow chart illustrating one example of a method 500 for powering a load. At 502, method 500 includes receiving a first voltage from a first power source. At 504, method 500 includes receiving a second voltage from a second power source. At 506, method 500 includes powering the load from the second power source. At 508, method 500 includes controlling the second power source to prevent a voltage at the load from exceeding the first voltage. At 510, method 500 includes determining whether the second power source is providing all the power it can to the load. If the second power source is not providing all the power it can to the load, then method 500 returns to block 502. If the second power source is providing all the power it can to the load, then at 512, method 500 provides additional power to the load from the first power source. Method 500 then returns to block 502.

In other examples, method 500 includes DC to DC converting the second voltage from the second power source to provide a regulated output current or a regulated output voltage for powering the load. Method 500 may also include maximizing the power provided by the second power source using a MPPT. In one example, method 500 includes receiving the first voltage from an AC adapter and receiving the second voltage from a PV panel.

Examples of the disclosure include an electronic device having a first input terminal for coupling to a first power source, a second input terminal for coupling to a second power source, and an output terminal for coupling to a load. The electronic device includes a blocking rectifier to prevent the second power source from back feeding the first power source. The electronic device also includes a control circuit to prevent the voltage at the load from exceeding a voltage provided by the first power source. The current drawn by the load is provided by the second power source up to the maximum current that can be provided by the second power source, and the remaining current drawn by the load is provided by the first power source.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A device comprising:
an output terminal to electrically couple to a load;
a first input terminal to electrically couple to a first voltage source;
a blocking rectifier electrically coupled between the first input terminal and the output terminal;
a second input terminal to electrically couple to a second voltage source, the second input terminal electrically coupled to the output terminal;
a control circuit to control the second voltage source to prevent a voltage at the output terminal from exceeding a voltage at the first input terminal and to deliver power to the load in place of power delivered by the first voltage source;
a DC to DC converter electrically coupled between the first input terminal and the output terminal; and
a maximum power point tracker including a maximum power point tracker circuit and a resistor electrically coupled to an input of the DC to DC converter to increase the power provided to the DC to DC converter from the second voltage source.

2. The device of claim 1, wherein the first voltage source comprises an AC adapter; and wherein the second voltage source comprises a photo-voltaic panel.

3. The device of claim 1, wherein the first voltage source comprises a battery; and
wherein the second voltage source comprises a photo-voltaic panel.

4. The device of claim 1, wherein the first voltage source comprises an AC adapter; and
wherein the second voltage source comprises a fuel cell.

5. The device of claim 1, wherein the blocking rectifier comprises a diode.

6. A device comprising:
a blocking rectifier to receive a first voltage and provide a first current;
a DC to DC converter to receive a second voltage and provide a second current, wherein the first current is summed with the second current to power a load;
a control circuit to control the DC to DC converter to prevent a voltage at the load from exceeding the first voltage; and
a maximum power point tracker including a maximum power point tracker circuit and a resistor electrically coupled to an input of the DC to DC converter to increase the power provided to the DC to DC converter from a power source.

7. The device of claim 6, wherein the DC to DC converter comprises a current regulator output to provide a regulated second current.

8. The device of claim 6, wherein the DC to DC converter comprises a voltage regulator output to source the second current.

9. The device of claim 6, wherein the control circuit comprises:

a first error amplifier to regulate the voltage across the blocking rectifier based on a bias voltage; and
a second error amplifier to control the second current based on feedback from the first error amplifier.

10. A method to power a load, the method comprising:
receiving a first voltage from a first power source;
receiving a second voltage from a second power source;
powering the load from the second power source;
controlling the second power source to prevent a voltage at the load from exceeding the first voltage;
increasing the power provided by the second power source using a maximum power point tracker, wherein the maximum power point tracker includes a maximum power point tracker and a resistor; and
providing additional power to the load from the first power source in response to the second power source providing all the power the second power source can provide to the load.

11. The method of claim 10, further comprising:
DC to DC converting the second voltage from the second power source to provide a regulated output current for powering the load.

12. The method of claim 10, further comprising:
DC to DC converting the second voltage from the second power source to provide a regulated output voltage for powering the load.

13. The method of claim 10, wherein receiving the first voltage from the first power source comprises receiving the first voltage from an AC adapter; and
wherein receiving the second voltage from the second power source comprises receiving the second voltage from a photo-voltaic panel.

* * * * *